United States Patent [19]
Wiesner et al.

[11] Patent Number: 5,632,538
[45] Date of Patent: May 27, 1997

[54] DRIVE SYSTEM FOR A CATERPILLAR TRACK

[75] Inventors: Hagen-Heinz Wiesner, Solingen; Klaus Spies; Bernd-Dieter Neubert, both of Remscheid, all of Germany

[73] Assignee: Diehl Remscheid GmbH & Co., Remscheid, Germany

[21] Appl. No.: 447,015

[22] Filed: May 22, 1995

[30]   Foreign Application Priority Data

Jun. 17, 1994 [DE] Germany .......................... 44 21 001.9

[51] Int. Cl.⁶ .......................................... B62D 55/08
[52] U.S. Cl. .................................. 305/194; 305/197
[58] Field of Search .......................... 305/185, 169, 305/178, 193–195, 197–199, 46, 51, 189, 191, 192, 196, 200, 201

[56]   References Cited

U.S. PATENT DOCUMENTS

| | | | |
|---|---|---|---|
| 1,856,068 | 5/1932 | Christie | 180/9.56 |
| 2,040,696 | 5/1936 | Johnston | 305/171 |
| 2,854,294 | 9/1958 | Bannister | 305/53 |
| 4,452,495 | 6/1984 | Orlandea | 305/11 |

FOREIGN PATENT DOCUMENTS

| | | |
|---|---|---|
| 2449021 | 9/1980 | France . |
| 1678343 | 6/1954 | Germany . |
| 2721018 | 11/1978 | Germany . |
| WO88/03624 | 5/1988 | WIPO . |
| WO91/07306 | 5/1991 | WIPO . |
| WO93/11022 | 6/1993 | WIPO . |

*Primary Examiner*—David M. Mitchell
*Assistant Examiner*—Jonathan J. Yun
*Attorney, Agent, or Firm*—Scully, Scott, Murphy & Presser

[57]   ABSTRACT

A drive system for a caterpillar track (30) comprises a drive wheel (1) with rubber-mounted drive bodies (10) fixed thereto, the drive bodies (10) engaging the guide tooth root (65) of the chain link member (52). The flank (51) of the guide tooth (32) is of a particular geometrical configuration in order to provide a long operating life for the rubber mounting means (21) of the drive body (10) by virtue of a small angle of rotational movement of the rubber casing (21).

11 Claims, 3 Drawing Sheets

DRIVE SYSTEM FOR A CATERPILLAR TRACK

BACKGROUND OF THE INVENTION

1. Field of the Invention

The invention relates to a drive system for a caterpillar or crawler track which includes rubber-coated chain link members with guide teeth, and wherein bars which drive the guide teeth are arranged on a drive wheel for driving of the caterpillar track.

2. Discussion of the Prior Art

A hinged chain comprising rubber-covered chain link members with guide teeth is known from U.S. Pat. No. 2,040,696. To drive the hinged chain, guide teeth of the chain engage between bars of a drive wheel. The guide teeth approximate to about a triangular shape in longitudinal section and have flat tooth flanks or sides. The tooth engagement surfaces of the bars are also provided with a flat engagement surface. When the chain is driven, the bars come into initial engagement in the vicinity of the head region of the guide tooth and slide in a corresponding manner along the drive flank of the guide tooth, until the guide tooth is completely in engagement with the drive wheel. The entry shocks and jolts between the metal bars and the metal guide teeth, as the teeth come into engagement with the drive wheel, and the polygon effect, give rise to vibrations and oscillation phenomena which in the case of a caterpillar or track-laying vehicle adversely affect the function of sensitive electronic and optical devices and increase the level of vibration and the radiated air-carried sound in the interior of the vehicle.

The object of the invention is to propose a low-vibration drive for a caterpillar track, which permits a long operating life.

SUMMARY OF THE INVENTION

The invention attains that object in accordance with the characterising feature in that rubber-supported drive members consisting of metal are arranged on the bars.

In accordance with the inventions vibrations are damped in the vicinity of their origin. The rubber mounting of the drive bodies damps in particular the entry shock and jolt as between the metal drive body and the guide tooth which also consists of metal, more specifically both from the moment of first contact until complete engagement occurs and until the drive body is lifted off when the guide tooth comes out of the drive wheel.

A further vibration-damping action is achieved by virtue of the rubber banding means on the drive wheel in conjunction with the drive wheel being in the form of a polygon. Each chain link member lies against the drive wheel over a large area and in a flat condition. That also affords a low rate of wear.

The rubber-mounted drive bodies and the rubber banding means damp in particular vibrations which occur as a result of the polygon effect when the chain runs into and runs out of the drive wheel. In that way the levels of vibration induced in a vehicle structure are only at a minimum so that sensitive electronic and optical devices remain interference-free.

An important consideration in regard to a chain link member sliding on to the drive wheel are the polygonal surfaces of the drive wheel between the drive bushes. That arrangement ensures that between the tooth flank of the guide tooth and the drive body, there is an extremely short friction region, more specifically directly in the vicinity of the root of the guide tooth. As a result of that short friction region, that arrangement affords a very low level of loading of the rubber mounting of the drive body. For, in the run-on phase of the chain, the angle of rotational movement of the rubber mounting is at a minimum. That affords a long service life for the pin mounting assembly and minimises vibration.

The polygonal configuration also affords the desired run-in kinematics in the drive bush/guide tooth flank region.

The polygonal configuration permits the tubular body to bear over a large area against the bending means of the drive wheel. That gives a low rate of wear.

Finally the polygonal configuration permits the required structural space for fixing the drive bushes in the drive wheel.

The drive wheel could also be of a circular configuration. The result would be detrimental conditions, in relation to the above-mentioned advantages.

The features of the invention contribute to a long operating life for the rubber mounting, in that the rubber casing is radially prestressed and has lateral expansion spaces within the drive bush.

The drive bush which is in the form of a circular ring, as set forth hereinbelow, permits the drive bush to enjoy a long operating life insofar as after a certain period of use it is turned through a given angle in relation to the direction of loading.

Ease of interchangeability of the drive bodies is ensured by the inventive constitution. A low level of loading on the guide tooth and thus a long service life is afforded by the novel tooth construction and achieved in a simple manner.

The geometry of the flanks of the guide tooth is of such a configuration, in accordance with the invention, that the contact point between the drive flank of the guide tooth and the drive bush lies in the region of the root of the guide tooth. The resulting short frictional travel movements result in a very small angle of rotational movement of the rubber mounting. The lower level of thrust loading on the rubber, which is produced by virtue thereof, affords the long operating life for the rubber mounting.

The degree to which vibrations are induced at the drive wheel is low by virtue of the chain link members and being of low mass. Because of the material used it is possible inexpensively to produce a chain link member which is low in weight. It is readily possible to have small wall thicknesses in the regions in which the level of loading is slight.

The drive wheel set forth herein comprises simple structural components and by virtue of the design configuration permits replacement of the drive bodies even when the chain is fitted and the drive wheel is mounted in position. With a certain depth of wear of the drive bush it is readily possible to produce a given angular displacement in order to bring an unworn zone of the drive bush into use.

The vibration damping action as between the mounting bush and the drive bush—even under load—is ensured by the inventively disclosed construction. This gives a connection involving a greatly reduced level of conduction of sound through solids, as between the drive bush and the drive wheel or the drive bush and the mounting bush. The rubber-covered chain pins of a connector chain as set forth in detail hereinbelow ensure a vibration-damping action in relation to the caterpillar track. That insulated vibration region relates only to the chain link member which is engaged by a drive bush. The vibrations which are produced in that procedure are not transmitted to adjacent chain link members, or are so transmitted only to a very low degree, by virtue of the rubber mounting means of the chain pins.

BRIEF DESCRIPTION OF THE DRAWINGS

Embodiments of the invention are illustrated in the drawing in which.

DETAILED DESCRIPTION OF PREFERRED EMBODIMENTS

Figure 1:
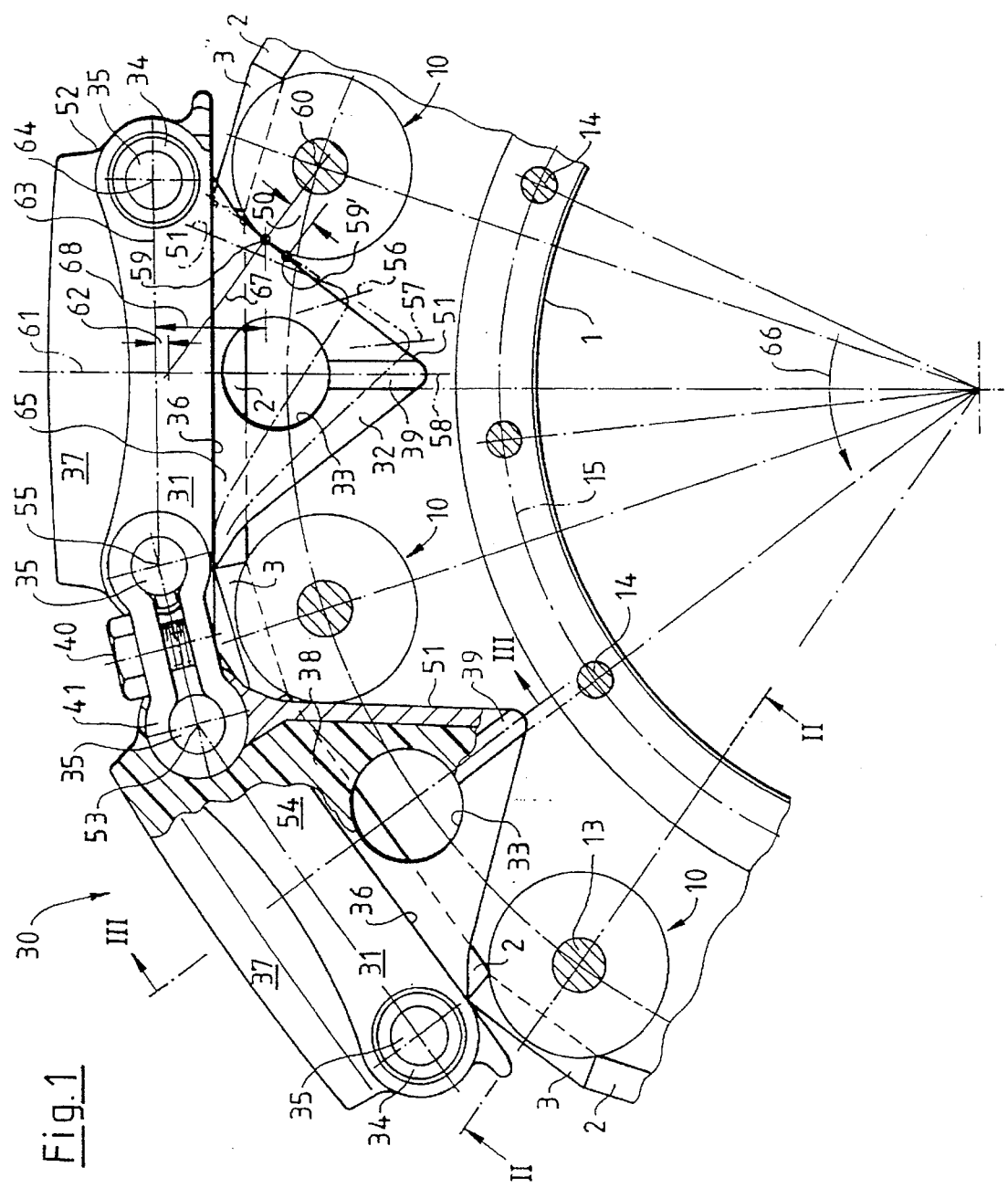
FIG. 1 shows a portion of a connector chain in engagement with a drive wheel.
Figure 2:
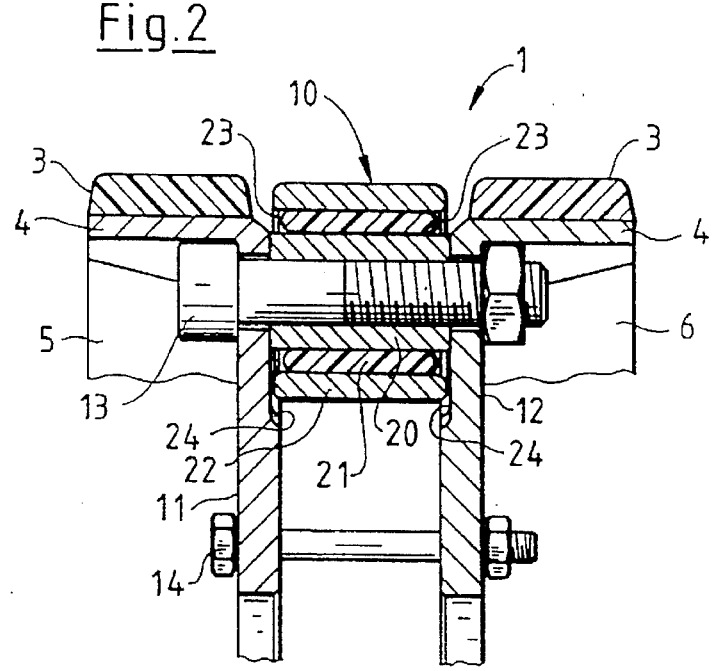
FIG. 2 is a view through the drive wheel in section taken along line II—II in FIG. 1.

As shown in FIGS. 1 and 2, a drive wheel 1 is connected in a manner not shown to a drive line of a track-laying vehicle. The drive wheel 1 is in the form of a polygon and at its periphery is fixedly connected to long and short rubber banding means 2, 3. The rubber banding means 2, 3 cover peripheral axial portions 4 of L-shaped discs 5, 6.

Drive bodies 10 lie between annular flanges 11, 12 and are fixed by screw connections 13. Additional connections 14 are disposed on an inner pitch circle 15 of the drive wheel 1 for fixing to a wheel hub (not shown).

Mounting bushes 20 are fixedly gripped at the ends between the annular flanges 11, 12 at each drive body 10 by the screw connections 13. A radially prestressed rubber casing 21 carries a drive bush 22 of a heat-treatable steel, the drive bush 22 being hardened at its surface layer. The rubber casing 21 can expand in the axial direction into respective free spaces 23.

The drive bush 22 is of an axially shorter length than the mounting bush 20. In addition recesses 24 are provided at the annular flanges 11, 12. The recesses 24 guarantee the sprung peripheral rotational or torsional movement and/or the radial spring travel of the drive bush 22. Upon compression the rubber casing can deflect laterally into the recesses 24. In that arrangement therefore the drive bush 22 remains freely movable both in the peripheral direction and also radially.

Figure 3:
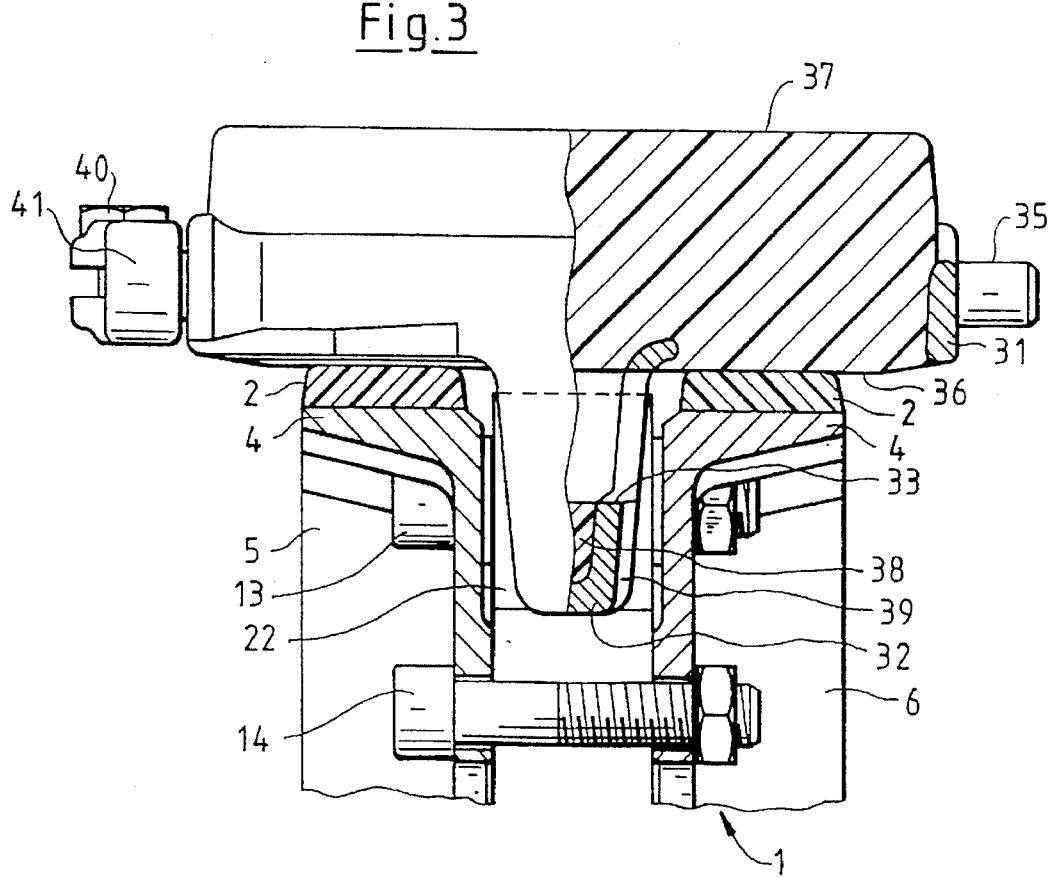
FIG. 3 is a view in section through a chain link member as shown in FIG. 1 taken along line III—III.

As shown in FIGS. 1 and 3 a connector chain 30 comprises a plurality of tubular bodies 31 cast from steel, with integrated guide teeth 32, each having a transversely disposed bore 33, pins 35 of steel which are provided with rubber mounting means 34, internal rubber coverings consisting of layers or pads 36, a side facing towards a travel roller, and outer rubber layers or pads 37 on the side facing towards a highway, as well as an inner rubber layer or pad 38 and connectors 41 which ere clamped fast on the pins 35 by way of screw connections 40.

The rubber coverings in the form of layers or pads 36–38 are integral. The rubber coating 38 damps any air-carried sound which is radiated from the chain 30 and which is produced by virtue of vibration phenomena when the chain 30 passes through the drive assembly.

Lateral grooves 39 on the guide teeth 32 serve to detect wear.

When the connector chain 30 runs into the drive wheel 1 as shown in FIG. 1, which rotates in the direction indicated by the arrow 66, there is a short friction travel distance 50 against the flank 51 of the chain link member 52. In the phase involving the chain running into the drive wheel, it is to be assumed that the flank 51, which is of a straight configuration, of the chain link member 54 already bears against the drive body 10. The chain link member 52 firstly pivots about an axis of rotation 53 of the chain link member 54, more specifically until the tubular body 31 of the chain link member 54 bears against the rubber banding means 2. The chain link member 52 then pivots about an axis of rotation 55 of the chain link member 52 in accordance with the positions 56 and 57 shown in dash-dotted lines, into the end position 58 shown in solid lines. In the position 56 there is no contact between the straight tooth flank 51 and the drive body 10. It is only in the position 57 that the tooth flank 51 touches the drive body 10 at the point 59'. Due to the further pivotal movement of the chain link member 52 into the end position 58, frictional contact is maintained between the tooth flank 51 and the drive body 10 so that the rolling and friction travel distance 50 is thereby defined by the spacing of the points 59 and 59'. In that respect the point 59' is associated with the position 57 of the tooth flank 51 and the point 59 is associated with the end position 58 of the straight tooth flank 51.

The extended line 67 which goes through the centre 60 of the drive body 10 and the contact point 59 =point of tangent of the tooth flank 51 to the drive body 10 cuts the axis of symmetry 61 of the guide tooth 33 at a small spacing 62, that is to say very close to the connecting line 63, in relation to the axes of rotation 55, 64 of the chain link member 52. The result of this is that the contact point 59 is in the region of the guide tooth root 65. Accordingly there is only a very short friction travel distance 50 so that the angle of rotary or torsional movement of the rubber casing 21 is small. In addition that results in a low level of thrust loading in regard to the rubber of the rubber casing 21, thereby guaranteeing that the rubber casing 21 has a long service life.

The contact point 59 is at a short distance 68 relative to the connecting line 63, that is to say the tilting moment produced by the drive wheel 1 at the tubular body 31 is small in comparison with the state of the art.

As shown in FIG. 1 the tooth flank 51 is straight and is bent away outwardly in order to increase the width of the tooth root 65.

Figure 4:
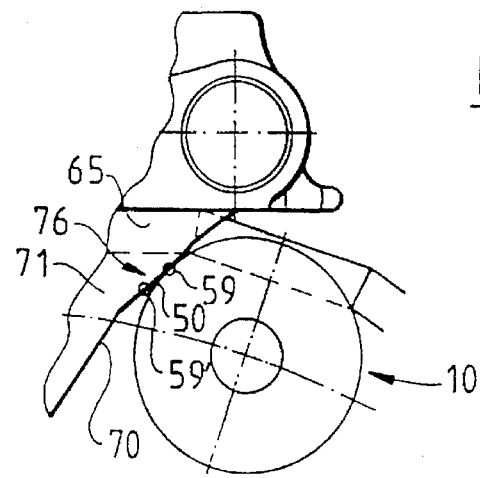
FIGS. 4–6 show different geometries of the flank of a guide tooth.
Figure 5:
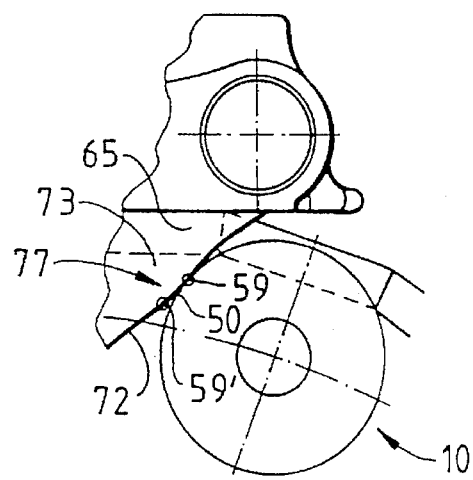
Figure 6:
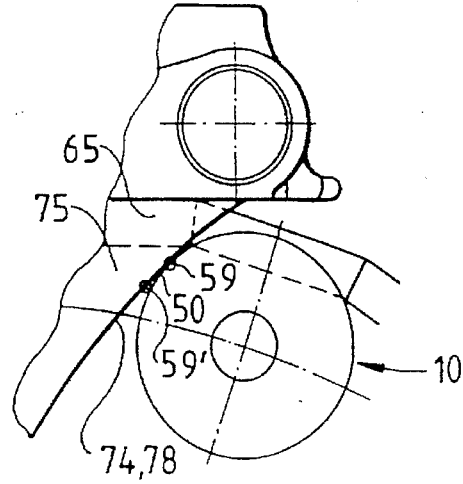

As shown in FIGS. 4–6, there are differing geometries in respect of the flanks 70, 72, 74 of the guide teeth 71, 73, 75. The tooth flank 70 shown in FIG. 4 is of a similar configuration to the tooth flank 72 shown in FIG. 5, by virtue of convex arcs 76, 77 in the region of the contact point 59. As shown in FIG. 6 the flank 74 of the guide tooth 75 is of a concave contour 78. That provides that the contact point 59 is displaced as far as possible in the direction of the guide tooth root 65 in order to provide a short friction travel distance.

Inexpensive and long-lasting rubber coating of the chain link member 52 is achieved if the rubber body which consists of one piece, with the portions consisting of the inner rubber coverings in the form of layers or pads 36, the outer rubber coverings in the form of layers or pads 37 and the rubber coating 38, is connected by vulcanisation to the chain link member 52 which comprises steel. The bulky rubber body with its large-area contact against the chain link member 52 guarantees a high degree of vibration damping and long operating lives for the inner rubber coverings in the form of layers or pads 36 on the travel roller side and the outer rubber coverings in the form of layers or pads 37 on the highway side. The rubber body can also be joined to the chain link member 52 by glueing, a positively locking connection and/or a force-locking connection.

We claim:

1. A drive system for a caterpillar track comprising a plurality of rubber-coated chain link members each having guide teeth; a drive wheel for driving said caterpillar track; bars for driving the guide teeth being arranged on said drive wheel; rubber-mounted drive bodies constituted of metal being arranged on said bars, support surfaces on the drive wheel being equipped with banding means consisting of rubber; mounting bushings of the drive bodies being each fixedly gripped between discs, drive bushings being mounted so as to be movable in radial and axial directions between said discs in recesses formed on opposite sides in the discs, each said drive body comprising one said drive bushing, one said mounting bushing, and a radially pre-stressed rubber casing for mounting said drive bushing on said mounting bushing, the mounting bushing and the drive bushing having free spaces therebetween at opposite edges thereof for receiving the rubber casing; and said drive wheel comprising two cup-shaped thin-walled essentially L-shaped discs having annular flanges which include faces interconnected by screw connecti/.3 at spacings conforming to the width of the drive members, said drive members being mounted on the screw connections.

2. A drive system according to claim 1, wherein said drive bushing has a circular annular cross-section and is constituted of metal.

3. A drive system according to claim 1, wherein releasable means interchangeably and rotatably fasten each said drive member to the drive wheel.

4. A drive system according to claim 1, wherein a contact point of the drive bushing is located in the region of a guide tooth root.

5. A drive system according to claim 4, wherein an extended imaginary line which passes through the center of each drive bodies and the contact point of the drive bushing intersects the axis of symmetry of the guide tooth in proximity to a connecting line between the pivot axes of the chain link members.

6. A drive system according to claim 4, wherein the geometry of the tooth flanks of each guide tooth is selectively rectilinear, convexly curved or concavely curved in a region of frictional contact.

7. A drive system according to claim 1 wherein each said chain link member is selected from the group of materials consisting of steel, aluminum, plastic or a composite; outer pad means and inner rubber pad means being arranged thereon to form an internal running surface portion.

8. A drive system according to claim 4, wherein each said chain link member has an integrated guide tooth possessing a transversely extending bore.

9. A drive system according to claim 1, wherein said caterpillar track comprises a connector chain having rubber-mounted pins and connectors fastened thereon.

10. A drive system according to claim 7, wherein said inner rubber layer is located facing towards a travel roller, an outer rubber layer facing a highway and a rubber layer in the guide tooth is of unitary construction and is fixedly attached to each said respective chain link member by selective vulcanization, gluing or by a positively-locking connection or form-fitted connection.

11. A drive system according to claim 1, wherein said drive wheel has a polygonal configuration including planar said support surfaces each equipped with said bonding means.

\* \* \* \* \*

UNITED STATES PATENT AND TRADEMARK OFFICE
CERTIFICATE OF CORRECTION

PATENT NO. : 5,632,538                    Page 1 of 2

DATED : May 27, 1997

INVENTOR(S) : Hagen-Heinz Wiesner, et al.

It is certified that error appears in the above-identified patent and that said Letters Patent is hereby corrected as shown below:

On the Title Page, Section [56], under U.S. PATENT DOCUMENTS, on line 2 insert the following:

--2,061,229    5/1932    Fergusson.................305/10
2,003,528    6/1935    Best...........................74/243--

After "Johnston..." insert the following:

--2,301,954    11/1942    Knox......................305/10
2,404,487    7/1942    Hait.......................115/1 --

After "Bannister.." insert the following:

--3,057,219    6/1961    Montogomery..............74/243
3,148,921    9/1964    Batur et al.....................305/35
3,231,316    1/1966    Ruf................................305/38
3,576,352    4/1971    Sato...............................305/35
3,578,822    5/1971    Slemmons.....................305/24
3,680,928    8/1972    Kraschnewski et al......305/57
3,889,550    6/1975    Boggs et al.....................74/443
3,954,308    5/1976    Korner et al..................305/40
4,021,081    5/1977    Orpana..........................305/35R
4,126,359    11/1978    Holze...........................305/11
4,278,301    7/1981    Gregor et al..................305/11
4,407,551    10/1983    Baylor..........................305/57
4,448,459    5/1984    Kortering et al.............305/38 --

UNITED STATES PATENT AND TRADEMARK OFFICE
CERTIFICATE OF CORRECTION

PATENT NO. : 5,632,538

DATED : May 27, 1997

INVENTOR(S) : Hagen-Heinz Wiesner, et al.

It is certified that error appears in the above-identified patent and that said Letters Patent is hereby corrected as shown below:

After "Orlandea..." insert the following:
--4,687,261   8/1987   Atkin...................305/57
--4,687,261   8/1987   Atkin...................305/57
  4,805,968   2/1989   Connerley.............305/39
  4,884,852  12/1989   Edwards et al........305,35EB
  5,078,454   1/1972   Rollinson..............301/44R
  5,255,964  10/1993   Hara.....................305/46 --

Column 2, line 33: "constitution" should read --construction--
Column 2, lines 63: "The..." should begin a new paragraph.
Column 3, line 57: "ere" should read --are--
Column 5, line 24, claim 1: "connecti/.3" should read --connections--

Signed and Sealed this

Twenty-first Day of July, 1998

Attest:

BRUCE LEHMAN

*Attesting Officer*

*Commissioner of Patents and Trademarks*